Patented Sept. 30, 1947

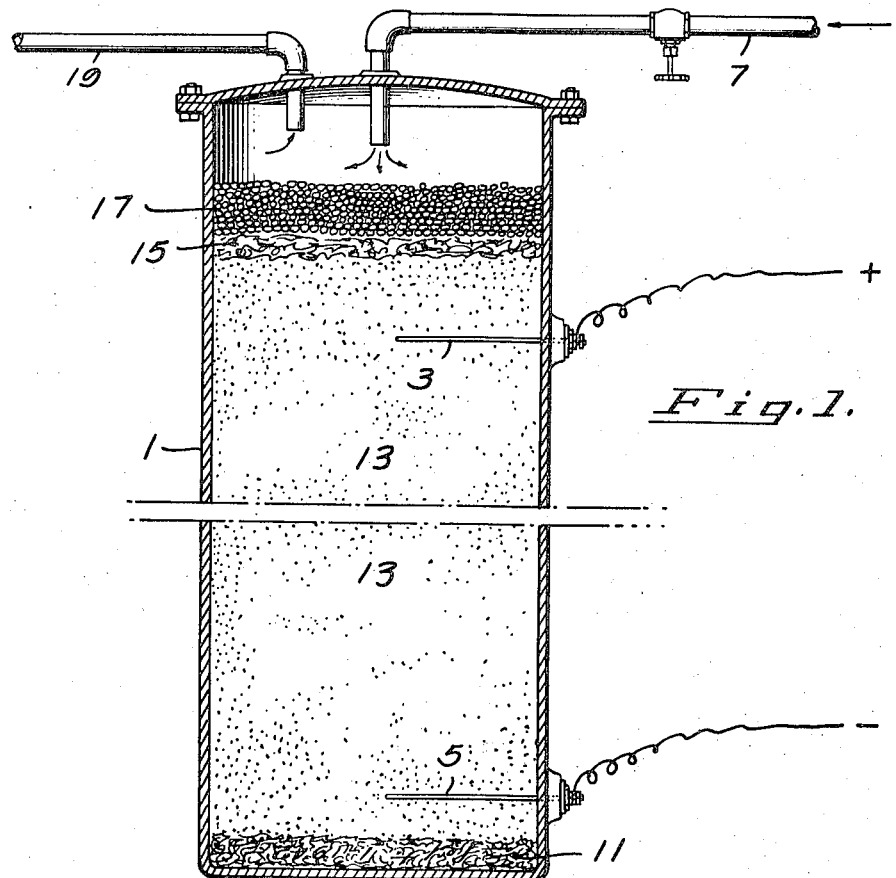
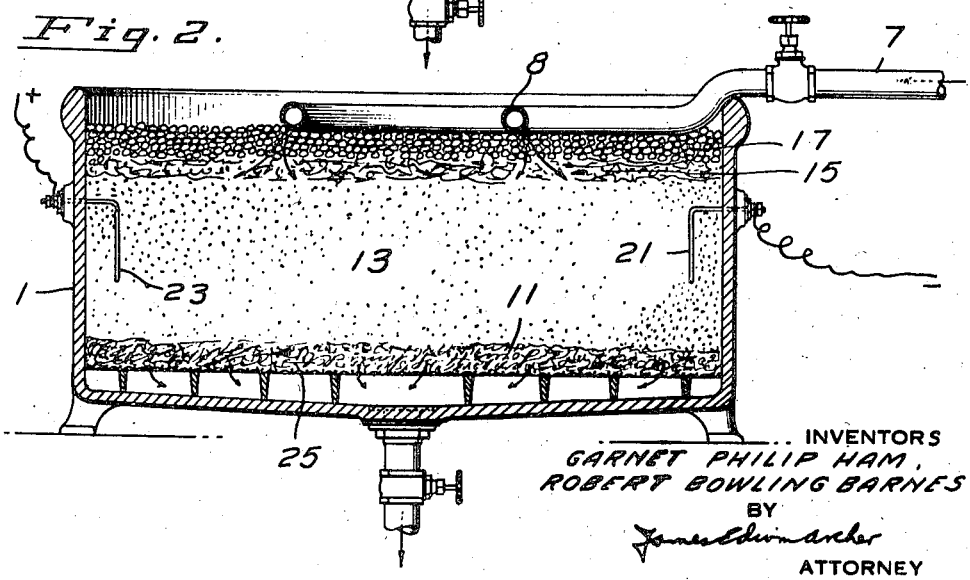

2,428,329

UNITED STATES PATENT OFFICE 2,428,329

REMOVAL OF BACTERIA FROM FLUIDS

Garnet Philip Ham, Old Greenwich, and Robert Bowling Barnes, Stamford, Conn., assignors to American Cyanamid Company, New York, N. Y., a corporation of Maine Application September 5, 1942, Serial No. 457,523

6 Claims. (Cl. 204—180)

This invention relates to the removal of bacteria from fluid media.

Many fluids such as water are often contaminated with harmful bacteria to such an extent that they can not safely be used for food, beverage, or medicinal purposes.

Many methods of killing bacteria have been proposed and a few of them have found wide application. None of the methods of killing bacteria which have been employed prior to our invention are completely satisfactory for all purposes and instances. Some methods do not kill with sufficient efficiency while other methods are too slow to be practical. Furthermore many of the prior art methods of killing bacteria involve the introduction of a toxic material such as chlorine into the fluid medium to be purified. Water treated with chlorine has an undesirable flavor and many people risk disease rather than use the distasteful chlorine in their drinking water.

An object of our invention is to provide a method of purifying fluids contaminated with bacteria by removing the bacteria from the fluid.

Another object of our invention is to provide fluids, particularly water, having a very low or substantially no bacterial content.

In the field of biologicals it is often desirable to concentrate bacteria and the like or to remove the bacteria from the medium in which they are found in order to transfer them into another desired medium.

It is therefore another object of our invention to provide a method of extracting bacteria and the like from fluid media for the production of biologicals as well as for various scientific uses.

The foregoing and other objects are attained by contacting a fluid medium containing bacteria or the like with an anion active material which has been or which is subjected to a source of high potential direct current electricity. This may be accomplished, for example, by passing a fluid such as water containing bacteria through a bed or column of anion active material to which is applied a high tension direct current by means of suitable electrodes. These electrodes are conveniently located at the top and bottom of the bed or column of anion active material.

Although our processes may be conducted in any suitable apparatus, the apparatus shown in the accompanying drawing has been found to be particularly adapted for our purposes.

Figure 1 is a side elevation view of one form of apparatus in which our process may be carried out, the apparatus being shown partially in cross section.

Figure 2 is the same type of view as Figure 1 but it shows a slightly different form of apparatus which is adapted for our process.

The construction of the apparatus as well as the understanding of the operation of our process will be apparent from the following:

A suitable vessel or container 1 is preferably constructed of glass, porcelain, or, if constructed of metal, it is preferably lined with glass, rubber or porcelain. An electrode, preferably a platinum electrode 3, is placed near the top of the vessel 1 and it extends either a short distance or substantially entirely across the vessel. A similar electrode 5 is inserted near the bottom of the vessel 1. The electrodes 3 and 5 are suitably insulated from the vessel 1 if the latter is metallic. High tension direct current potential is applied to the electrodes 3 and 5 by any suitable means. Preferably, the electrode near the top of the vessel 1 is made the anode while the electrode near the bottom of the vessel 1 is made the cathode. The electrodes 3 and 5 may be in the form of a wire or rod or they may be in the form of a screen or foraminous plate which partially or completely covers the horizontal cross sectional area of the vessel 1. The vessel 1 is provided with a feed conduit 7 and an outlet conduit 9 both of which may be constructed of materials similar to those specified for the vessel 1.

A relatively thin layer of glass wool 11 may be placed in the bottom of the vessel 1 and on top of the glass wool an anion active resin 13 is well packed in order to avoid channeling of the fluid passing through the apparatus. On the top of the resin another layer of glass wool 15 is placed and this is followed by a layer of glass beads 17. Optionally, an overflow pipe 19 is connected into the top of the vessel 1.

Water or other fluid containing bacteria flows in through conduit 7 down through the resin in vessel 1 and out through conduit 9. During the passage of the water a high tension direct current potential is applied to electrodes 3 and 5. The effluent flowing from conduit 9 has a substantially lower bacterial content than the feed which flows in through conduit 7.

In Figure 2, container 1 is shown as a relatively shallow vessel as compared to vessel 1 in Figure 1 where the vessel is represented as a relatively long column. The feed pipe 7 in Figure 2 is connected to a perforated distributor conduit 8 which may be formed into a circle. The container 1 is provided with an outlet conduit 9. In Figure 2, electrodes 21 and 23 are inserted in the side of container 1 preferably diametrically opposite each other. A supporting screen, grate, or other foraminous support 25 is placed in the bottom of container 1. On top of the support 25 a layer of glass wool is placed followed by well packed resin 13 and this in turn is followed by another layer of glass wool 16 on top of which there is a layer of glass beads 17. The operation of the apparatus shown in Figure 2 is apparent from the description of the operation of the apparatus in Figure 1. The container 1, conduits 7, 8 and 9, and support 25 may be constructed of metal, porcelain, glass, synthetic resin, or any other desired material. If metal be used it is preferable that it be lined with glass, porcelain or rubber.

The following examples in which the proportions are in parts by weight except as otherwise indicated are given in way of illustration and not in limitation. In order to demonstrate the high efficiency of our invention we have used fluids contaminated with bacteria to an extremely high degree. It is apparent that the efficiency of removing bacteria from a fluid medium would be greater with more prolonged contact of the fluid and the anion active material.

Example 1

A glass column about ¾ inch in diameter and 24 inches long is provided with two platinum electrodes about 19 inches apart. Each electrode consists of No. 22 gauge platinum wire and extends inside of the glass column a distance of about ½ inch. The electrodes are preferably relatively small in order to reduce the current density in the column as much as possible since our invention deals with the application of the high potential to the column of resin, but not to the passage of high currents of electricity through the column. It is to be noted that the current density employed according to our invention is insufficient to actually kill the bacteria. In this example the top electrode was the anode although our process contemplates the use of the anode at either the bottom or the top of the column. However, it is preferable to have the anode at or near the top of the column as somewhat better results are obtained as compared to those obtained if the position of the anode and the cathode be reversed. This is, of course, based upon the direction of flow being from top to bottom. We have found that the number of bacteria appears to be considerably greater in the vicinity of the anode than at the cathode.

The glass column is packed with an anion active resin (resin "A"). The resin is activated and after washing away any excess of the activating solution the pH of water flowing from the column is about 7.6 at 25° C. The entire apparatus is preferably steam sterilized at 121° C. before the resin is placed in the column. Sterilized water was passed through the resin to wash out any free contaminating material or free bacteria.

About one liter of a bacterial suspension containing about 1,000,000 colonies per cc. of *B. coli* was passed through the column at a rate of about 14 cc./min. The effluent was collected in about 100 cc. fractions, diluted and aliquot proportions were withheld for bacteriological plating purposes. The plating was done using nutrient agar and cultivation was carried out at 37° C. for 24 hours. The plating was done in the conventional Petri dishes which were divided into 32 equal sections and the colonies counted in at least six so that a comprehensive average for the entire group could be obtained.

A direct current having a potential of about 460 volts was applied to the electrodes. The current varied from about 0.7 milliampere to about 1.2 milliamperes. The bacteriological examination of each of the 100 cc. fractions showed that there were substantially no colonies of bacteria in any of the fractions of effluent.

Example 2

About 1 liter containing about 700,000 colonies of suspension of Prodigiosus per c. c. was passed through the resin in accordance with Example 1. The effluent was collected in 100 cc. fractions after which 1 cc. thereof was diluted with 25 cc. of nutrient agar, incubated at 37° C. for 24 hours and then bacteriologically examined. The process was carried out for this example using a potential of 600 volts and a current of about 1 milliampere. The potential was removed during the passage of the seventh and eighth 100 cc. fractions of effluent. The bacteriological examination showed that there were substantially no colonies of bacteria surviving in any of the fractions of effluent.

This example shows that when the anion active resin has been subjected to an electrical potential for a short period of time, it will retain its enhanced activity for a period of time after the potential has been removed.

Example 3

About 1.2 liters of a bacterial suspension of Prodigiosus containing about 550,000 colonies per cc. was passed through a column prepared in accordance with Example 1. The rate of flow was 14 cc./min. and the effluent was collected in 100 cc. fractions. The fractions of effluent were diluted and aliquot proportions plated in accordance with Example 2. During the passage of the first 400 cc. of effluent no current was applied to the electrodes. A bacteriological examination of the second 100 cc. fraction contained about 50 colonies of Prodigiosus per cc. the third fraction contained about 18 colonies of Prodigiosus per cc. while the fourth fraction contained more than 200 colonies of Prodigiosus per cc. During the passage of the fifth 100 cc. fraction of effluent a potential of 780 volts was applied to the electrodes which permitted the passage of 1 milliampere of current. The bacteriological examination of this fraction of effluent showed only 100 colonies of Prodigiosus per cc. During the passage of the sixth 100 cc. fraction of effluent the applied potential was raised to 1560 causing the passage of 2 milliamperes of electricity and causing the bacteriological count to drop to 1 colony of Prodigiosus per cc. During the passage of the seventh to twelfth 100 cc. fractions of effluent the applied voltage was maintained at 1200 volts to cause the passage of about 1.5 milliamperes of current. The bacteriological examination of these fractions of effluent showed the bacterial count to be as follows:

| Fraction | Prodigiosus Colonies per cc. |
| --- | --- |
| 7 | 5 |
| 8 | 2 |
| 9 | 0 |
| 10 | 0 |
| 11 | 0 |
| 12 | 0 |

The results of this examination show the improved effect obtained by the use of the electrical potential as compared to the results obtained with the resin alone.

It has been disclosed and claimed in the co-pending application of Robert Bowling Barnes, Serial Number 457,524, filed September 5, 1942, that the anion active resins are highly effective in removing bacteria from fluid media. However, our process which makes use of an electrical potential in connection with anion active resins is an improvement over the invention described in the aforementioned application. It is possible to remove bacteria more efficiently and with a shorter period of contact by employing a high electrical potential in conjunction with the anion active resins.

The mechanism by which the various processes described extract, adsorb, occlude or otherwise withdraw the bacteria from the fluid is unknown to us at this time. Accordingly, we do not intend that our invention should be limited to the particular explanations expressed or implied.

It is to be noted, however, that the anion active resin employed in the preceding example has an electro-positive charge of approximately +0.3 volt under the conditions as shown. The resin has a high dielectric resistance and in its wet state it has the power to retain applied electrical charges beyond those apparent in the resin-water system proper. When the resins have been or are subjected to the electrical potential an electro-attractiveness to bacteria, particularly bacteria which carries a negative charge, is apparently increased considerably. The electrical potential difference (platinum-half cell/calomel electrode system) for B. coli and Prodigiosus is apparently within the range of −0.2 m. v. to about −0.4 m. v.

A valuable feature of our invention is that the bacteria remain in contact with the resin particles in a virulent condition.

The bacteria may be removed from the resin by washing with water or other fluids and if desired they may be killed or rendered inactive by treating them with a germicidal solution or a bacteriostatic solution or by subjecting it to a high potential high frequency discharge by subjecting them to ultra violet radiations, etc. Thus bacteria may be collected for use in the preparation of biologicals or for use in scientific studies.

Our bacterial suspensions contained only about 0.00005 g./cc. of sodium chloride and therefore with the small current density employed sufficient chlorine could not be formed to destroy any substantial number of bacteria. In order to confirm this tests were made using ortho toluidine as an indicator. Furthermore the use of Schiff's Reagent failed to indicate the presence of any aldehydic materials which might impart some germicidal action and which conceivably might result from some decomposition of the resin.

Instead of passing the fluid containing bacteria through an anion active resin which is or which has been subjected to a high electrical potential, the former may be agitated in a suitable vessel with a sufficient quantity of the resin to achieve the desired result, said vessel containing electrodes to which a high potential is applied or said resin may have been previously subjected to a high electrical potential. Furthermore, our invention contemplates the use of any number of beds of anion active resin as well as recirculation of the effluent through one or more of these beds.

Treatment of fluids containing bacteria in accordance with our invention may be preceded or followed by any other treatments to remove or kill bacteria if desired.

Preparation of resin "A"

| | Parts |
|---|---|
| Urea | 24 |
| Guanidine nitrate | 26 |
| Formalin (37% formaldehyde in water) | 98 |
| Soda ash | 6.3 |
| Water | 61 |

The water, formalin and soda ash are charged into a kettle, preferably glass-lined, and equipped with a reflux condenser and an agitator. The urea and guanidine nitrate are then added and the resulting mixture is heated to the reflux point and maintained at this point for about 1–6 hours. During this operation the mixture is thoroughly agitated. This mixture is transferred to a suitable vessel, preferably glass-lined, and heated to about 90° C. To this with vigorous agitation, about 3.6 parts of hydrochloric acid (specific gravity 1.19) in about 6.1 parts of water are added gradually and the material is then cooled as quickly as possible to about 70° C., thereby gelling the material. The gelled material should be further cooled, optionally by removing it from the vessel, breaking up into small pieces and spreading out on trays. The resulting material is ground to any desired fineness, e. g., a size that will pass 8 mesh.

The ground gel is distributed evenly on trays, preferably glass-lined, and these trays are placed in a suitable drier. The temperature is raised to about 50° C., held for about 5–6 hours, raised about 10° every half hour until about 100° C. is reached and is maintained at the latter temperature for about 2 hours. If necessary, the material may be reground or screened to a suitable size.

Any other anion active resin may be substituted for both or all of the anion active resins in the foregoing examples, e. g., m-phenylene diamine-formaldehyde resins, polyamine-formaldehyde resins, alkyl and aryl substituted guanidine-formaldehyde resins, alkyl and aryl substituted biguanide-, and guanyl urea-formaldehyde resins, etc. corresponding condensation products of other aldehydes, e. g., acetaldehyde, crotonaldehyde, benzaldehyde, furfural or mixtures of aldehydes may also be employed if desired. The resins such as those prepared from the guanidine, guanyl urea, biguanide, the polyamines, and other materials which do not form substantially insoluble condensation products with formaldehyde for most practical purposes are preferably insolubilized with suitable materials, etc., urea, aminotriazines, especially melamine, the guanamines which react with formaldehyde to produce insoluble products, etc. Furthermore, mixtures of the anion active materials as well as mixtures of the insolubilized materials may be used. The anion active resins may be prepared in the same general manner as that described in Patents Numbers 2,251,234 or 2,285,750. Usually it is convenient to employ the salts of the bases such as guanidine but the free bases may also be used. Examples of suitable salts for use in preparation of anion active resins are: guanidine carbonate, guanidine sulfate, biguanide sulfate, biguanide nitrate, guanyl urea sulfate, guanyl urea nitrate, guanyl urea carbonate, etc.

The anion active resins may be activated or regenerated by passing a dilute solution, e. g., 0.1%–5% of sodium carbonate, caustic soda, potassium carbonate, potassium hydroxide, organic bases and the like through the bed and subsequently washing with water.

This invention is especially adapted to the removal of bacteria carrying a negative charge although it is not limited thereto. However the efficiency of the removal of bacteria from fluid media is especially high in the case of the negatively charged bacteria.

The electric current which is applied to the anion active resin is preferably between about 100 and 2000 volts D. C., but even higher voltages may be employed if desired. The current density is preferably kept as low as possible in order to avoid undesired decomposition of the resin or of any salts which may be present in the fluid medium or of the fluid medium itself. Furthermore, if it be desirable to recover the bacteria in a virulent condition, the current density should not be high enough to kill the bacteria.

Our invention is not limited to the removal of bacteria from liquids such as water, but is applicable to any liquid or any gas. If gases are to be purified such as for example, air, it is preferable that the resin be maintained in a damp or wet condition. Thus, for example, air may be bubbled through a column packed with an anion active resin which is or which has been exposed to a high potential electric current either with the column being kept substantially full of water or with water trickling or being sprayed down over the surface of the resin. Gases may also be passed over an anion active resin after first being saturated with water vapor. If this method be employed it may be desirable to carry out the process at temperatures ranging from room temperature up to about 50° C.

Obviously, many modifications and variations in the processes and compositions described above may be made without departing from the spirit and scope of the invention as defined in the appended claims.

We claim:

1. A process for removing bacteria from liquid media which comprises activating a granular dielectric material which is an unexhausted anion active material by applying a direct electric current potential of about 100–2000 volts thereto, in the presence of a liquid, by means of electrodes of such size and so spaced that the current passing between such electrodes when a liquid is present is insufficient to kill bacteria in said last mentioned liquid, and contacting the resulting activated dielectric material with a liquid medium containing bacteria.

2. A process for removing bacteria from aqueous media which comprises activating a granular dielectric material which is an unexhausted anion active material by applying a direct electric current potential of about 100–2000 volts thereto, in the presence of an aqueous liquid by means of electrodes of such size and so spaced that the current passing between such electrodes when liquid is present is insufficient to kill bacteria in said liquid and passing an aqueous medium containing bacteria through a bed of the resulting activated dielectric material.

3. A process which comprises passing an aqueous medium containing bacteria through a bed of a granular dielectric material which is an unexhausted anion active material which is activated by applying a direct electric current potential of about 100–2000 volts thereto, by means of electrodes of such size and so spaced that the current passing between such electrodes when said aqueous media is present is insufficient to kill bacteria in said last mentioned liquid.

4. A process as in claim 3 wherein the anion active material is a formaldehyde condensation product of guanidine and urea.

5. A process as in claim 3 wherein the aqueous medium contains B. coli.

6. A process which comprises passing an aqueous medium containing bacteria through a bed of a granular dielectric material which is an unexhausted anion active material which is activated by applying a direct electric current potential of about 100–2000 volts thereto, by means of electrodes of such size and so spaced that the current passing between such electrodes when said aqueous media is present is insufficient to kill bacteria in said liquid, and collecting at least a portion of the effluent which contains a lower concentration of bacteria than said medium.

GARNET PHILIP HAM.
ROBERT BOWLING BARNES.

REFERENCES CITED

The following references are of record in the file of this patent:

UNITED STATES PATENTS

| Number | Name | Date |
|---|---|---|
| 2,167,225 | Van Eweyk | July 25, 1939 |
| 1,738,801 | Shemitz et al. | Dec. 10, 1929 |

FOREIGN PATENTS

| Number | Country | Date |
|---|---|---|
| 427,199 | Great Britain | Apr. 17, 1935 |
| 149,966 | Austria | June 25, 1937 |

OTHER REFERENCES

Turneaure et al., "Public Water Supplies," Third Edition, copyrighted 1924, published by John Wiley & Sons, pages 426–429.

Falk, "Electrophoresis of Bacteria," published in "Colloid Chemistry," by Alexander, vol. II, by the Chemical Catalog Co., in 1928, pages 738, 742.